(12) United States Patent
Dover

(10) Patent No.: US 7,885,990 B2
(45) Date of Patent: Feb. 8, 2011

(54) RANDOM TELEGRAPH SIGNAL NOISE AS A SOURCE FOR RANDOM NUMBERS

(75) Inventor: Lance W Dover, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 922 days.

(21) Appl. No.: 11/756,363

(22) Filed: May 31, 2007

(65) Prior Publication Data

US 2008/0301210 A1 Dec. 4, 2008

(51) Int. Cl.
*G06F 1/02* (2006.01)
(52) U.S. Cl. .................................................. 708/255
(58) Field of Classification Search ................ 708/255
See application file for complete search history.

(56) References Cited

U.S. PATENT DOCUMENTS

| 7,426,527 | B2 * | 9/2008 | Strum et al. ................ 708/3 |
| 2008/0091755 | A1 * | 4/2008 | Mudge et al. ............. 708/250 |
| 2009/0262929 | A1 * | 10/2009 | Walmsley .................. 380/46 |
| 2010/0057820 | A1 * | 3/2010 | Matsumoto et al. ........ 708/250 |

* cited by examiner

*Primary Examiner*—Tan V Mai
(74) *Attorney, Agent, or Firm*—Cool Patent, P.C.; Joseph P. Curtin

(57) ABSTRACT

An apparatus and method for providing a source of random numbers are generally described. In one example, an apparatus includes one or more storage elements having a selected voltage and a trip point, the voltage being close enough to the trip point such that random telegraph signal (RTS) noise associated with the elements is a determinant of whether the read voltage is above or below the trip point.

14 Claims, 4 Drawing Sheets

RANDOM TELEGRAPH SIGNAL NOISE AS A SOURCE FOR RANDOM NUMBERS

TECHNICAL FIELD

Embodiments of the present invention are generally directed to the field of random number generation and, more particularly, to techniques using random telegraph signal (RTS) noise.

BACKGROUND

Cryptographic systems often require a reliable source of randomness. For example, random numbers are commonly used for temporary symmetric session keys or asymmetric key generation. Current random number generators may leverage thermal noise as a source of randomness. Using a paired oscillator approach, thermal noise is amplified and extracted as random numbers. However, this approach requires significant area on a semiconductor device. The continuous shrinking of semiconductor devices demands scalable solutions for generating random numbers in these devices.

BRIEF DESCRIPTION OF THE DRAWINGS

Embodiments of the present invention are illustrated by way of example, and not by way of limitation, in the figures of the accompanying drawings in which like reference numerals refer to similar elements and in which.

Figure 1:
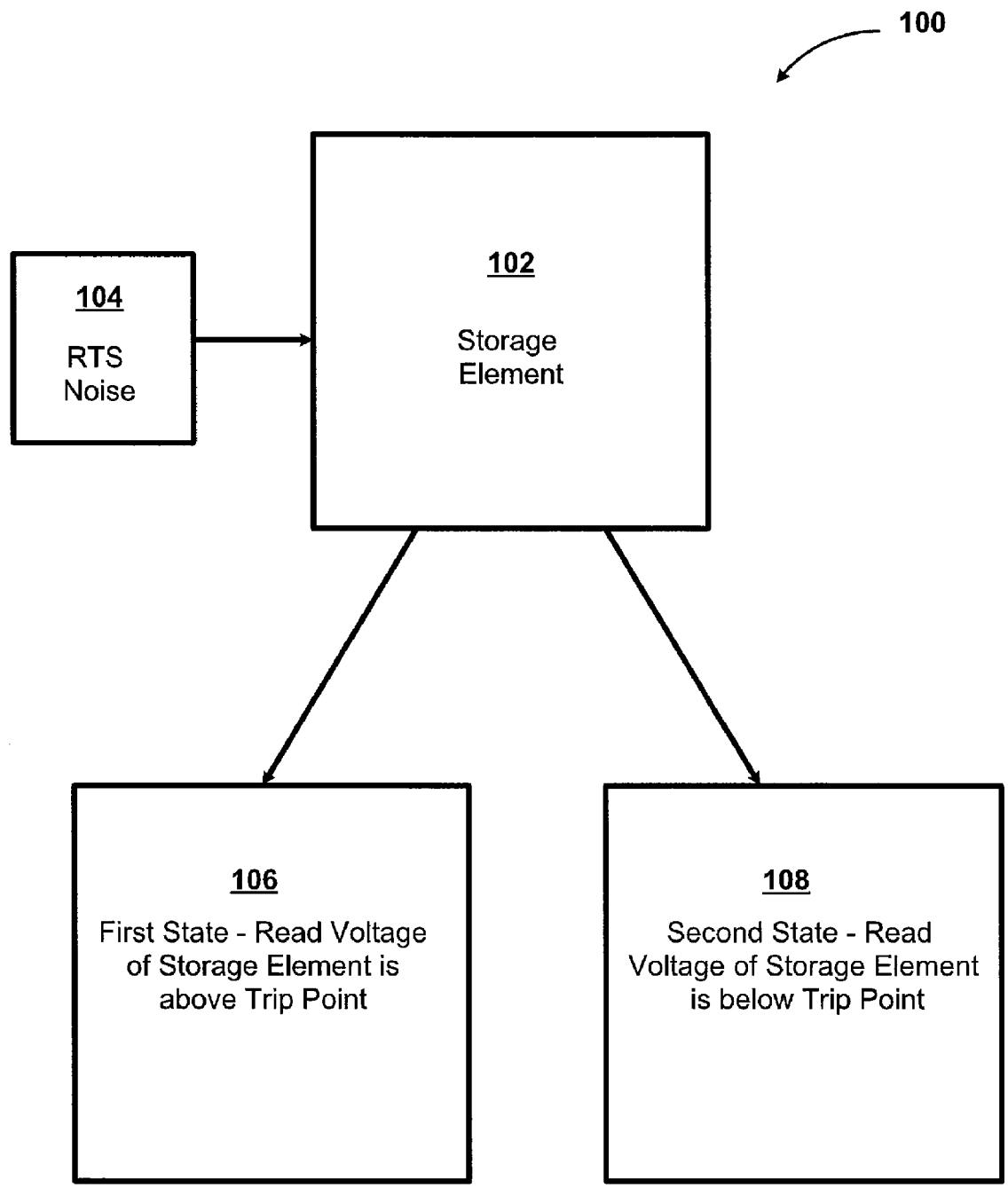
FIG. 1 is a schematic illustrating the possible effects of RTS noise on one or more storage elements, according to but one embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of an apparatus, method, and system to provide a source of random numbers are described herein. In the following description, numerous specific details are set forth to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Carrier trapping and detrapping may modify the threshold or trip point voltage of a microelectronic storage element such as a flash cell. Such behavior is commonly referred to as random telegraph signal (RTS) noise. In this regard, RTS noise may obscure the selected or stored voltage in a flash cell. For example, when a flash cell is read, RTS noise may cause the read voltage to be different than the selected or stored voltage in the flash cell. RTS noise is generally not predictable; therefore, RTS noise may be used as a source of randomness for a variety of purposes. For example, RTS noise can be exploited as a source of random numbers for cryptographic systems, temporary symmetric session keys, or asymmetric key generation. Furthermore, cryptosystems often protect nonvolatile information, and as such it is likely that emerging microelectronic storage elements such as flash memory will include related cryptographic protection measures. This protection may benefit from a local source of randomness as RTS noise provides.

An RTS approach provides a benefit of lower silicon cost because it uses much less silicon than thermal noise random number generators, for example. Also the bandwidth (KB/s) of an RTS solution is much more scalable and only limited by the sense width and sense time of the storage elements.

FIG. 1 is a schematic 100 illustrating the possible effects of RTS noise 104 on a storage element 102 in accordance with but one embodiment. In one embodiment, schematic 100 depicts a storage element 102 having a selected voltage and a trip point, RTS noise 104 associated with the one or more storage elements, and two possible resultant values of storage element 102 as a result of the RTS noise 104—a first state 106 where the read voltage of element 102 is above the trip point and a second state 108 where the read voltage of element 102 is below the trip point.

For ease and clarity of discussion, the embodiment 100 has been described above in terms of a single storage element 102, however, multiple storage elements such as those found, for example, in an array of flash memory cells fall within the scope of this description. In an embodiment, one or more storage elements 102 comprise one or more flash memory cells. In another embodiment, one or more storage elements 102 comprise one or more non-volatile floating gate storage elements. In an example embodiment, storage elements 102 comprise one of various forms of read only memory (ROM). In other embodiments, one or more storage elements 102 are used to provide a source of random numbers.

In an embodiment, one or more storage elements 102 have a selected voltage and a trip point. The selected voltage may be stored in the storage element 102. In one embodiment, a number of storage elements 102 are programmed with a voltage that is close to the element's trip point. In another embodiment, one or more storage elements 102 having a trip point are programmed with a selected voltage, the voltage being close enough to the trip point such that RTS noise 104 associated with the elements 102 is a determinant of whether the read voltage is above 106 or below 108 the trip point. Such arrangement may help isolate the RTS noise and provide a source for extracting random numbers. In another embodiment, RTS noise 104 associated with the elements 102 is the primary determinant of whether the read voltage is above 106 or below 108 the trip point. A conceptual framework of how RTS noise affects a selected voltage is provided in FIG. 2. In an embodiment, a flash cell 102 uses RTS noise 104 as a source of randomness for the purpose of generating random numbers used in cryptosystems.

In practice, RTS events cause measurable noise with a typical magnitude being in the tens of mV range. Thus, voltages that are placed within this magnitude of the expected trip point will likely be noticeably affected by the RTS noise. In an embodiment, the selected voltage or voltages are between 0 mV and 200 mV from the trip point.

The voltages in the storage elements 102 may vary due to a variety of factors including being programmed with different selected voltages, environmental factors, or physical differences in the storage elements themselves. In an embodiment, the storage elements 102 are programmed with selected voltages that compensate for shifts in environmental factors such as temperature-induced voltage differences or charge loss or gain associated with device usage over time. In another embodiment, the selected voltage is selected to reduce the effects of usage, the environment and physical differences in the storage elements 102 over time.

The selected or stored voltage of each storage elements 102 may not be exact, but may fall within a distribution around the ideal trip point for a certain set of physical, environmental and usage conditions. Some voltages may be higher than the trip point and some may be slightly lower. Conceptually, most stored voltages are sufficiently close to the trip point such that RTS noise 104 is the primary factor in determining which side of the trip point the read voltage resides at any point in time, according to one embodiment. Accordingly, when read, one or more suitably programmed elements 102 generate one or more bits that are highly influenced by the presence of RTS noise 104. A bit that is highly influenced by RTS noise may have a value that is primarily determined by RTS noise. For example, if the read voltage is above the trip point, then the storage elements 106 generates a bit with a value of zero ('0 b). If the read voltage is below the trip point then the storage elements 108 generates a bit with a value of one ('1 b). In an embodiment, the read voltage is used to generate a bit having a value that is highly influenced by RTS noise 104, wherein the generated bit is not generally predictable to provide a source of random numbers for a cryptographic system.

In an embodiment, reading a suitable number of elements 102 using an algorithm to isolate the elements 102 that exhibit randomness provides a reliable source of random numbers. The initial voltage placement may help minimize the effects of usage, the environment, and physical differences in the elements 102 over time. The set of random data, while not generally predictable, may exhibit a bias towards more than 50% '1 b or 50% '0 b. Here, the quality of the voltage placement and the algorithm used to extract the data helps determine the overall quality of the resultant bits. In an embodiment, the generated bits are processed or "whitened" by any number of industry-accepted techniques such as Von Neuman correction, linear feedback shift register (LFSR), hashing, or encryption algorithms.

Figure 2:
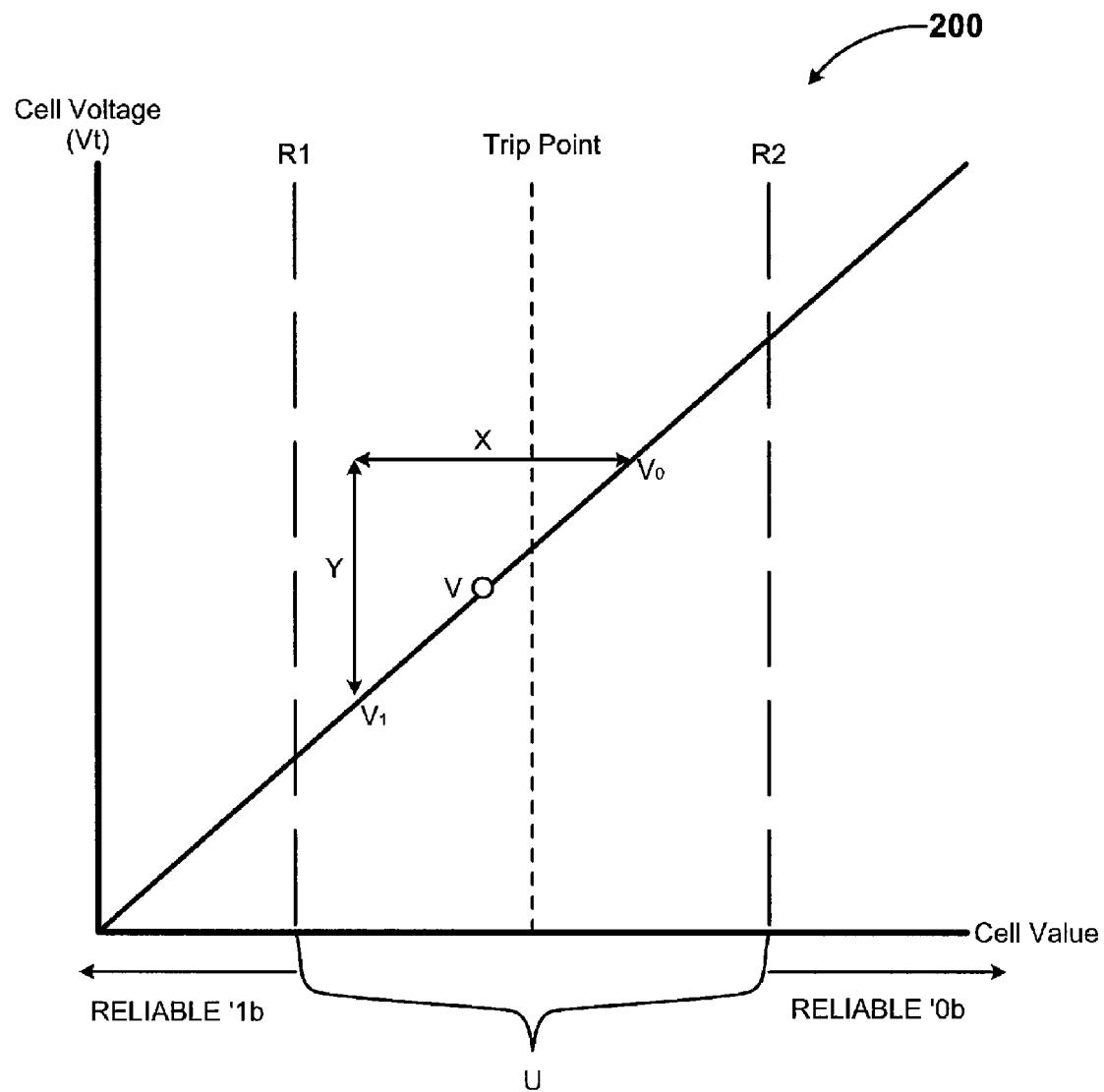
FIG. 2 is a conceptual graph illustrating the effect of RTS noise on a selected voltage for a storage element, according to but one embodiment.

FIG. 2 is a conceptual graph 200 illustrating the effect of RTS noise, Y, on a selected voltage, V, for a storage element or cell, according to but one embodiment. It should be noted that the graph is not drawn to scale with any particular cell or voltage in mind. The graph primarily depicts the interaction of RTS noise with a selected voltage of a cell on a conceptual level.

Here, the graph 200 shows a selected voltage V that is close to the trip point of a cell. In the illustrated embodiment, selected voltage V is below the trip point. As depicted on the x-axis, the cell value may be a reliable '1 b (below dashed line R1), a reliable '0 b (above dashed line R2), or within an area of uncertainty U. A selected voltage V within the area of uncertainty U may provide less determinate cell values as a result of various factors including the initially selected voltage, RTS noise, environmental factors, usage, or physical characteristics of the cell.

In the illustrated embodiment, the selected voltage V falls within the region of uncertainty U. Within the region of uncertainty U, a cell value is still assigned to a cell dependent on the read voltage. For example, voltages that are read between R1 and the trip point generate a bit with a value of one while voltages that are read between R2 and the trip point generate a bit with a value of zero. However, the cell value is much less determinable or even unpredictable in region U due to the factors that increase uncertainty. In region U, RTS noise Y is a primary factor in determining the cell value when read, according to an embodiment.

In one embodiment, RTS noise Y determines whether the selected voltage V is read above the trip point, as in the case of $V_0$, or below the trip point, as in the case of $V_1$. At any given moment in time, RTS noise Y may affect V by a magnitude represented by line Y, which may be variable. For example, RTS noise Y may be larger or smaller in magnitude than represented in the illustration at different moments in time, affecting the read voltage and whether the generated bit has a value of '1 b or '0 b. In other embodiments, the selected voltage V may be above the trip point.

Figure 3:
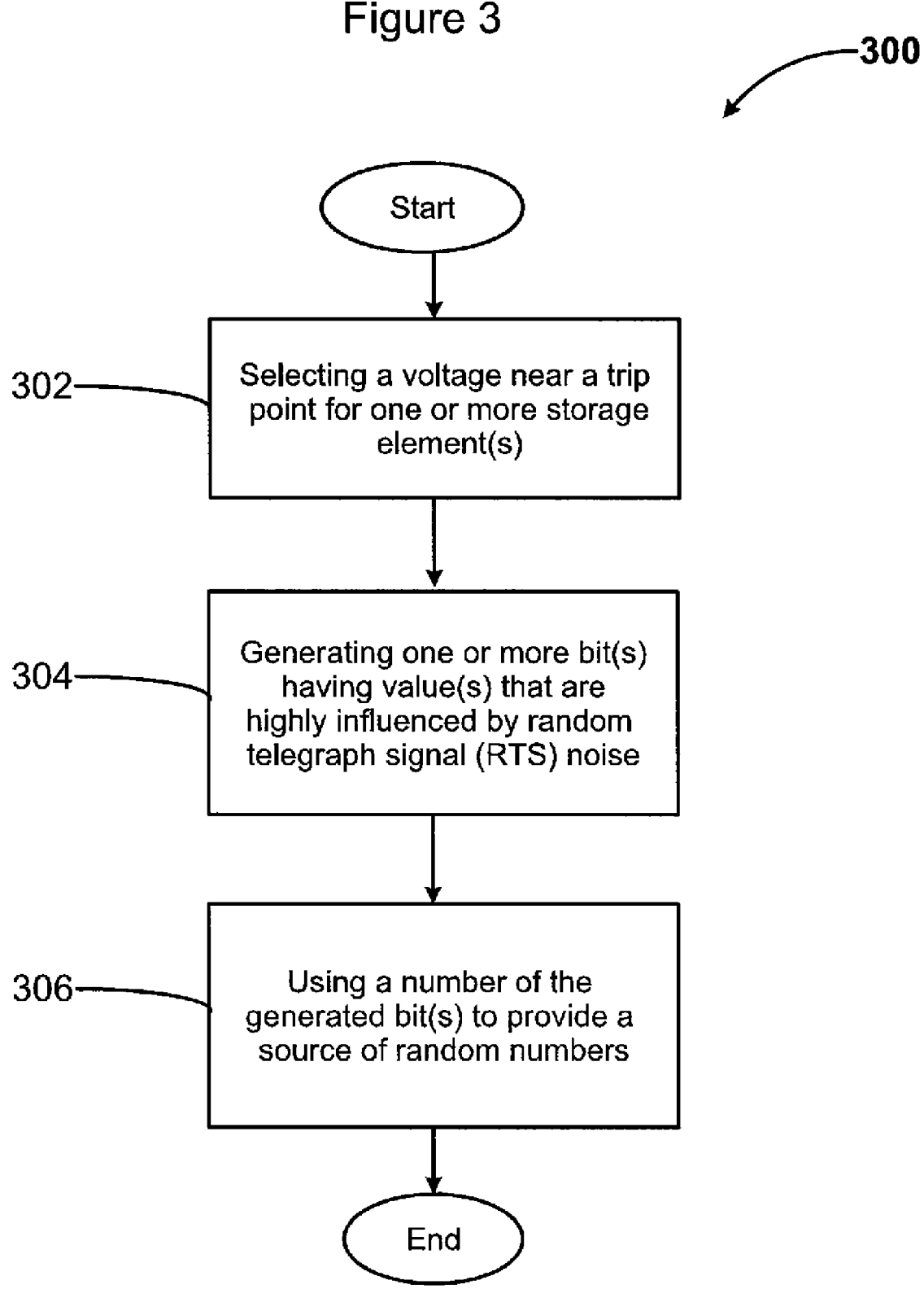
FIG. 3 is a flowchart illustrating a method to provide a source of random numbers, according to but one embodiment.

FIG. 3 is a flowchart 300 illustrating a method to provide a source of random numbers, according to but one embodiment. In one embodiment, a method 300 comprises selecting a voltage near a trip point for one or more storage elements 302, generating one or more bits having values that are highly influenced by random telegraph signal (RTS) noise 304, and using a number of the generated bits to provide a source of random numbers 306.

In an embodiment, selecting a voltage near a trip point for one or more storage elements 302 includes selecting a voltage close enough to the trip point such that RTS noise associated with the elements is a determinant of whether the read voltage is above or below the trip point. In another embodiment, the selected voltage is close enough to the trip point such that RTS noise associated with the elements is a primary factor of whether the read voltage is above or below the trip point.

In an embodiment, generating one or more bits having values that are highly influenced by random telegraph signal (RTS) noise 304 accords with various embodiments already described in FIGS. 1 and 2.

In another embodiment, selecting a voltage 302 includes selecting a voltage for one or more flash memory cells. In an embodiment, selecting a voltage 302 includes selecting a voltage to reduce the effects of usage, the environment, and physical differences in the storage elements over time. Another embodiment includes selecting a voltage from between 0 mV and 200 mV from the trip point, where the magnitude of RTS noise is typically in the tens of mV range.

In one embodiment, using a number of the generated bits to provide a source of random numbers 306 includes reading a number of elements using an algorithm to isolate the elements that exhibit randomness. In another embodiment, using a number of the generated bits 306 includes using the generated bits to provide a source of random numbers for a cryptographic system.

In one embodiment, method 300 also includes processing one or more bits using Von Neuman correction, linear feedback shift register (LFSR), hashing, or encryption algorithms.

Figure 4:
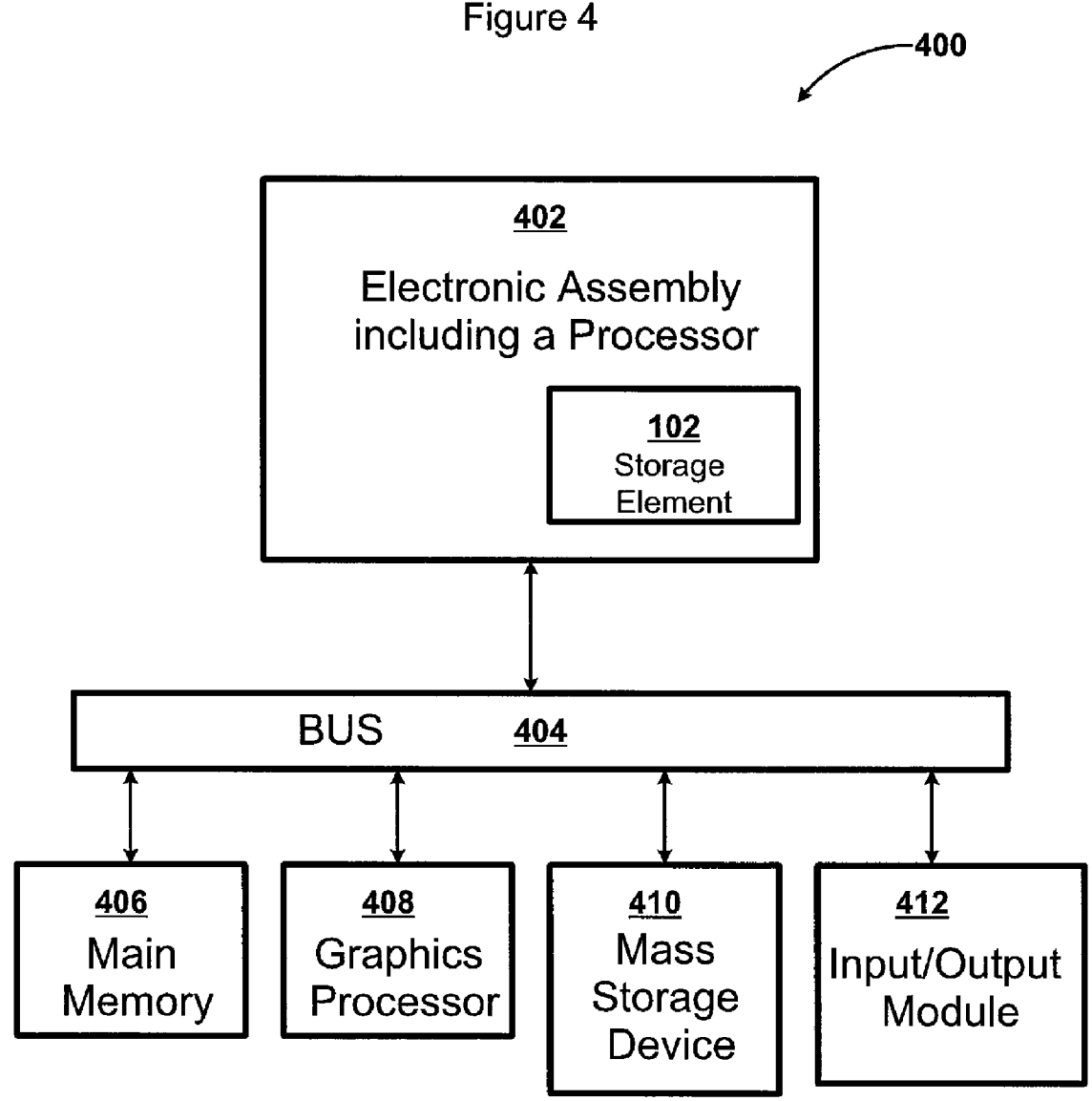
FIG. 4 is a schematic of an example system in which embodiments of the present invention may be used, according to but one embodiment.

FIG. 4 is a diagram illustrating an example system in which embodiments of the present invention may be used. In one embodiment, an electronic assembly 402 includes an apparatus 102 that accords with apparatus 102 in FIG. 1 and also other applicable embodiments described in FIGS. 2 and 3. In an embodiment, apparatus 102 includes one or more storage elements such as one or more flash memory cells, for example. Assembly 402 may further include a microprocessor or multiple microprocessors. In an alternate embodiment, the electronic assembly 402 may include an application specific IC (ASIC) or multiple ASICs. Integrated circuits found in chipsets (e.g., graphics, sound, and control chipsets) may also be packaged in accordance with embodiments of this invention.

For the embodiment depicted by FIG. 4, the system 400 may also include a main memory 406, a graphics processor 408, a mass storage device 410, and/or an input/output module 412 coupled to each other by way of a bus 404, as shown. Examples of the memory 408 include but are not limited to static random access memory (SRAM) and dynamic random access memory (DRAM). Memory 406 may also include one or more storage elements in accordance with embodiments of the present specification including embodiments described in relation to FIGS. 1-3. Examples of the mass storage device 410 include but are not limited to a hard disk drive, a compact disk drive (CD), a digital versatile disk drive (DVD), flash memory and so forth. Mass storage device 410 may also include one or more storage elements in accordance with embodiments of the present specification including embodiments described in relation to FIGS. 1-3. Examples of the input/output module 412 include but are not limited to a keyboard, cursor control arrangements, a display, a network interface, and so forth. Examples of the bus 404 include but are not limited to a peripheral control interface (PCI) bus, and Industry Standard Architecture (ISA) bus, and so forth. In various embodiments, the system 400 may be a wireless mobile phone, a personal digital assistant, a pocket PC, a tablet PC, a notebook PC, a desktop computer, a set-top box, a media-center PC, a DVD player, or a server, but is not limited to these examples, and may include other electronic assemblies.

Various operations may be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
   One or more storage elements having a selected voltage and a trip point, the voltage being close enough to the trip point such that random telegraph signal (RTS) noise associated with the elements is a determinant of whether the read voltage is above or below the trip point.

2. An apparatus according to claim 1, wherein the one or more storage elements comprise one or more flash memory cells.

3. An apparatus according to claim 1 wherein the selected voltage is selected to reduce the effects of usage, the environment, or physical differences of the storage elements over time, or combinations thereof.

4. An apparatus according to claim 1 wherein the read voltage is used to generate a bit having a value that is highly influenced by RTS noise.

5. An apparatus according to claim 4 wherein the generated bit is not generally predictable to provide a source of random numbers.

6. An apparatus according to claim 4 wherein the generated bit is used to provide a source of random numbers for a cryptographic system.

7. An apparatus according to claim 1 wherein the selected voltage is between 0 mV and 200 mV from the trip point.

8. A method comprising:
   selecting a voltage for one or more storage elements having a trip point, the selected voltage being close enough to the trip point such that random telegraph signal (RTS) noise associated with the elements is a determinant of whether the read voltage is above or below the trip point;
   generating one or more bits having values that are highly influenced by RTS noise; and
   using a number of the generated bits to provide a source of random numbers.

9. A method according to claim 8 wherein selecting a voltage for one or more storage elements comprises selecting a voltage for one or more flash memory cells.

10. A method according to claim 8 wherein selecting a voltage for one or more storage elements comprises selecting a voltage to reduce the effects of usage, the environment, or physical differences in the storage elements over time, or combinations thereof.

11. A method according to claim 8 wherein using a number of the generated bits to provide a source of random numbers comprises reading a number of elements using an algorithm to isolate the elements that exhibit randomness.

12. A method according to claim 8 further comprising:
   processing one or more bits using Von Neuman correction, linear feedback shift register (LFSR), hashing, or encryption algorithms.

13. A method according to claim 8 wherein the generated bits are used to provide a source of random numbers for a cryptographic system.

14. A method according to claim 8 wherein the selected voltage ranges between 0 mV and 200 mV from the trip point.

* * * * *

UNITED STATES PATENT AND TRADEMARK OFFICE
CERTIFICATE OF CORRECTION

| | | |
|---|---|---|
| PATENT NO. | : 7,885,990 B2 | Page 1 of 1 |
| APPLICATION NO. | : 11/756363 | |
| DATED | : February 8, 2011 | |
| INVENTOR(S) | : Lance W Dover | |

It is certified that error appears in the above-identified patent and that said Letters Patent is hereby corrected as shown below:

IN THE CLAIMS:

In column 6, line 5, in Claim 1, delete "One" and insert -- one --, therefor.

Signed and Sealed this
Twenty-sixth Day of April, 2011

David J. Kappos
*Director of the United States Patent and Trademark Office*